United States Patent [19]

Roisen

[11] Patent Number: 4,509,273

[45] Date of Patent: Apr. 9, 1985

[54] COMBINE GRAIN DRYER AND DRYING ATTACHMENT

[76] Inventor: David Roisen, Rte. 2, Dawson, Minn. 56232

[21] Appl. No.: 365,002

[22] Filed: Apr. 2, 1982

Related U.S. Application Data

[63] Continuation of Ser. No. 233,924, Feb. 12, 1981, abandoned.

[51] Int. Cl.³ .............................................. F26B 17/20
[52] U.S. Cl. ........................................ 34/86; 34/182; 56/12.2; 56/16.5; 110/227
[58] Field of Search ............................ 34/35, 86, 182; 110/227, 102; 432/133, 139, 61, 62; 56/12.2, 16.4, 16.5; 165/DIG. 2

[56] References Cited

U.S. PATENT DOCUMENTS

| 2,396,363 | 3/1946 | McLeod. |
| 2,465,070 | 3/1949 | Deumth. |
| 2,698,170 | 12/1954 | Foley. |
| 2,756,554 | 7/1956 | Diehl et al. |
| 2,806,337 | 9/1957 | Rezabek. |
| 3,410,065 | 11/1968 | Martin. |
| 3,527,031 | 9/1970 | Winger. |
| 3,543,488 | 12/1970 | Kowalik et al. |
| 3,572,663 | 3/1971 | Van Der Lely. |
| 3,581,407 | 6/1971 | Ward et al. |
| 3,585,730 | 6/1971 | Morse. |
| 3,623,298 | 11/1971 | Hitzhusen .................. 56/16.5 |
| 3,636,939 | 1/1972 | Sijbring. |
| 3,732,435 | 5/1973 | Strandberg et al. .......... 34/52 |
| 4,010,552 | 3/1977 | Peterson .................... 34/182 |
| 4,021,929 | 5/1977 | Black. |
| 4,038,758 | 8/1977 | Miller. |
| 4,088,122 | 5/1978 | Miles. |
| 4,209,918 | 7/1980 | Klein. |
| 4,311,102 | 1/1982 | Kolze et al. .............. 110/101 CD |

OTHER PUBLICATIONS

Farm Journal-Jan., 1980, p. 18.
The Farmer-Jan. 3, 1981, p. 38.

Primary Examiner—Larry I. Schwartz
Attorney, Agent, or Firm—Merchant, Gould, Smith, Edell, Welter & Schmidt

[57] ABSTRACT

A drying attachment for use with a combine (10) for harvesting grain is disclosed and claimed. The attachment includes a distributor receptacle (18) in which the shelled corn or other grain is received after being separated from cobs, husks, and other residue material. After being received in the receptacle (18), it is transferred through a plurality of drying tubes (20) to a storage bin (19). The residue material is burned in a furnace (22) which is carried by the combine (10). The heat thereby generated is conducted to the drying tubes (20) wherein moisture is absorbed from the grain passing through the tubes (20).

11 Claims, 4 Drawing Figures

COMBINE GRAIN DRYER AND DRYING ATTACHMENT

This is a continuation of application Ser. No. 233,924, filed Feb. 12, 1981, now abandoned.

TECHNICAL FIELD

The invention of the present application refers broadly to the field of agricultural implements. More specifically, however, it is directed to a dryer mounted integrally as part of a combine for drying grains harvested, while the implement is accomplishing the combining process and being transported from the field to an unloading area.

BACKGROUND OF THE INVENTION

Agricultural implements known as combines are typically used for harvesting grain and cereal crops. Such machines are used for harvesting wheat, beans, corn, and other such crops.

In addition to severing the crop plant from the ground, combines thrash the severed plants to separate the grains from the stocks, husks, cobs, and other residue materials. After the thrashing process is performed upon the plants, the products of this process are conveyed to a sifting conveyer by which the grain is separated from the residue. Generally, after this separation has occurred the residue is distributed back on the ground worked by a spreader structure mounted at the rear of the combine.

The grain, however, after having been sifted, is conveyed to a storage bin. In many combines, this bin is located at a height above the structure by which thrashing and separating is accomplished. In order to raise the grain to the storage bin, an elevator is used.

When working of a particular field is completed, the combine returns to a storage silo or similar structure, and the grain carried in the storage bin is transferred to the silo.

Grain from plants recently severed from the ground typically contains a high moisture content. With almost all grains, some drying of the grain must be accomplished prior to placing it in the storage silo. If this drying were not effectuated, the grain could rot and become unholsum.

The prior art has taught the drying of the grain by a dryer positioned near the silo. After the grain is dried, an elevator transfers it into the silo. Another way in which drying is accomplished is by transferring the grain from the storage bin of the combine to an upward position in the silo by means of an elevator. With this type of drying, a dryer is mounted within the silo at this upward location. After the grain is dried, it is passed to a hopper from which it is discharged into the lower levels of the silo.

Drying of grains prior to storage by any of the methods discussed is extremely inefficient. Little drying is accomplished from the time the plant is severed from the ground until it is passed through a dryer unit positioned near the storage silo. Consequently, a significant amount of the farmer's time is wasted in drying the grain prior to storage. This is time that could be spent harvesting additional amounts of the grain.

In an effort to more efficiently utilize time, some prior art devices have attempted to effect the drying function, to a degree, while the combine is in the fields. U.S. Pat. No. 4,038,758 (Miller) discloses such a structure. The device of this patent uses radiators for circulating water from the engine block in order to preheat air that is forced through a heating element. With devices such as this, however, sufficient quantities of thermal energy are not available to accomplish a meaningful measure of drying while the combine is in the field.

Besides being inefficient with respect to time, methods of drying, as presently practiced, are also inefficient with respect to energy. This is true particularly with respect to corn. Shelled corn, in order to be safely stored, should not have a moisture content any higher than 15 percent. When severed from the ground, however, corn kernels have a moisture content between 20 and 24 percent. Under the most favorable circumstances, therefore, the kernels need be dried to eliminate 5 percent moisture. Under the worst circumstances, however, they need be dried to eliminate 9 percent.

At present energy prices, costs for drying one bushel of shelled corn to a point where it can be stored are at least 5 cents per percentage point of moisture content which must be eliminated. These costs appear to be applicable regardless of whether an electrical, natural gas, or fuel oil dryer is utilized.

The costs, therefore, for drying one bushel of shelled corn would range between 25 and 45 cents. When considering that six to seven billion bushels of shelled corn are harvested annually, one can see that an extremely significant energy expenditure is involved.

With crops such as beans and wheat, the energy expenditure is not quite as significant. Even still, however, not insignificant costs are involved with these crops.

It is to this situation that the invention of the present application is directed. The present invention is designed to economize on both the farmer's time and the costs involved in drying his grains for storage.

SUMMARY OF THE INVENTION

The invention of the present application is an agricultural attachment for use with harvesting combines, which attachment can be affixed to the combine to form an intergral part thereof. The combine functions to separate the grain of a plant harvested from residue material such as husks, leaves, cobs, and stalks. The attachment includes a receptacle in which the moisture laden grain is received. The grain is, thereafter, transferred from the receptacle to a dried grain storage bin. Thermal energy is provided to dry the grain as it is being transferred. A furnace is provided to serve as the source of thermal energy. The residue material is deposited in the furnace after the separation process is effected. The residue material serves as the fuel which is combusted within the furnace to generate the heat. The heat so generated is conducted to, and permeates throughout, the grain as it is transferred from the receptacle to the storage bin.

In a preferred embodiment, the receptacle can have a plurality of outlets so that it serves a manifold function wherein the grain in the receptacle is split into various portions. The grain can be passed through tubes, each of which communicates with one of the outlets of the receptacle, and into the storage bin. The grain can be passed through the tubes by use of a plurality of augers, one of which is disposed in each of the tubes.

Permeation of the grain passing through the tubes with the thermal energy generated by the furnace can be accomplished by passing a gaseous fluid suffused with the thermal energy generated by the furnace through the tube and about the grain. Perforations can be provided in each of the tubes to allow entry of the fluid.

A sensor can be provided so that the percentage of moisture content of the grain, as it enters from the tubes into the bin, can be ascertained. Means can be provided so that, if the moisture content exceeds an acceptable level, the speed of the rotation of the augers and, in turn, the speed of passage of the grain through the tubes, can be decreased. The grain can, thereby, be exposed to the thermal energy generated by the furnace for a longer period of time.

The augers can be driven by a plurality of fluid motors, one of the motors driving each of said augers. The motors can be operatively connected to the sensor so that, if the percentage of moisture content sensed at the entry of the grain to the bin exceeds the acceptable level, the speed of the motors will be automatically reduced.

The furnace into which the silage materials are deposited can comprise a generally cylindrical firebox having an aperture through an upwardly disposed portion of the cylindrical wall defining the firebox. A hopper narrowing downwardly can be seated in the aperture so that silage material deposited in the hopper will pass downwardly to the firebox. Air for combustion can be introduced into the firebox at a location proximate the bottom thereof. The furnace can include an exhaust conduit which is perforated to admit the thermal energy laden exhaust gases. This conduit can be positioned centrally within the firebox.

The furnace can include baffles to both direct the residue material to a location where it is combusted and to inhibit escape of the heat laden exhaust gases. An inverted, generally V-shaped baffle can be made to overlie the exhaust conduit. A pair of baffles extending downwardly and inwardly from the wall of the firebox can also be included. This pair of baffles would be positioned above, and spaced from, the V-shaped baffle to define channeling walls for directing the residue material into the firebox. At the same time, the baffles redirect upwardly passing gasses back down to prevent escape of heat.

Since the heat necessary to dry a particular quantity of grain is somewhat less than that which is capable of being generated by the residue associated with that same quantity of grain, means can be provided for controlling the rate of inflow of the residue material to the firebox. The amount of combustion air can also be regulated. The means for controlling the inflow of these combustible components can be either automatically or manually operated.

The invention of this application is thus an attachment for use with a harvesting combine for separating a crop grain from residue material. Since it is used as part of the combine and can be operated concurrently with the harvesting of the crop and thrashing of the crop plants to separate the grain from the residue, significant time can be saved in drying the grain. The specific advantages of the invention will become more apparent with reference to the accompanying drawings, detailed description of the invention and claims.

DETAILED DESCRIPTION OF THE INVENTION

Figure 1:
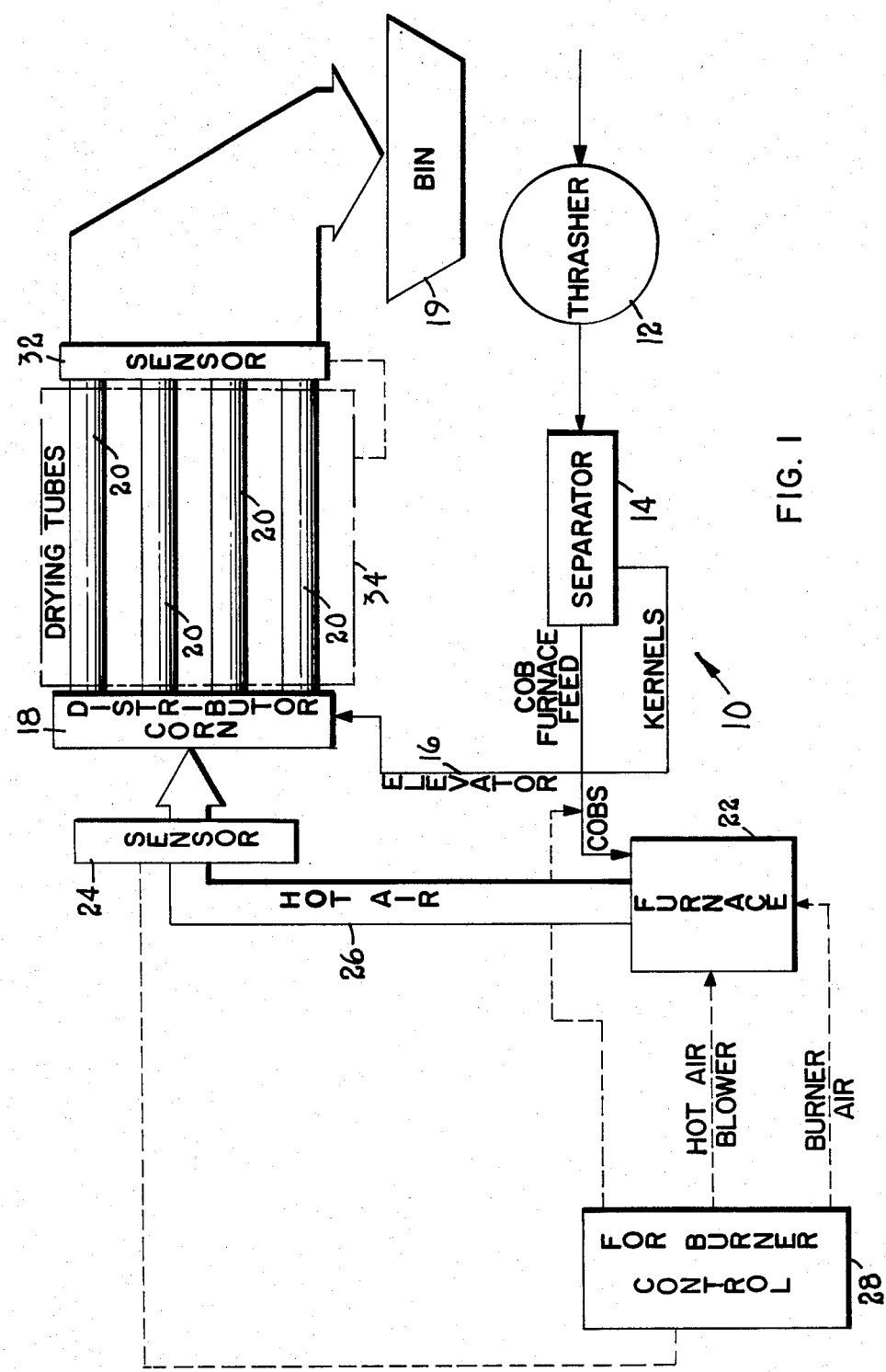
FIG. 1 is a schematic view of a combine, including the dryer attachment in accordance with the present application, for separating and drying corn kernels.

Referring now to the drawings wherein like reference numerals denote like elements throughout the several views, FIG. 1 illustrates schematically a combine 10 having attached thereto a drying attachment in accordance with the present invention. At the bottom right of the figure, a thrasher 12 is schematically illustrated. The thrasher 12 serves to work harvested grain plants in order to separate the grain from the residue material such as stalks, leaves, and cobs. All the material so worked is passed to a separator 14 which, in most combines, is a sieve type element which allows the grain to pass therethrough during a shaking step, and passes on the residue material.

Although the combine 10 can appropriately be used for any number of grains, further reference to FIG. 1 will assume that the crop being worked and dried is corn.

The corn kernels separated from the cob are passed by an elevator 16 into a receptacle 18 for distribution of the corn. Transfer means move the kernels to a grain storage bin 19. Four transfer tubes 20 are illustrated in FIG. 1. It will be understood, however, that any number of tubes 20 may be utilized and that other transfer means such as a conveyor would be appropriate.

The cobs and other residue materials are deposited in a furnace 22 where they are combusted to produce thermal energy. This energy is, in turn, conducted to the corn kernels as they pass through the drying tubes 20. As discussed in the BACKGROUND OF THE INVENTION the moisture content of the corn must be reduced to the extent of at least 5 percentage points and, in many cases, as much as 9 percentage points. It has been determined that the heat which is necessary to accomplish this drying of one bushel of corn kernels can be generated by burning only approximately one-half of the cobs from which those kernels came. A sensor 24 can, therefore, be provided in the hot air line 26 going to the grain drying tubes 20. This sensor 24 can measure the temperature of a gaseous fluid, whether it be the products of combustion or clean air to which the thermal energy has been transferred, and the amount of thermal energy available for the drying process.

An automatic controller 28 for the furnace burner can be provided to control the amount of combustion air and combustable cobs and other residue materials going to the furnace 22. Additionally, this controller 28 can control a fan 30, better illustrated in FIG. 2, which functions to deliver the gaseous fluid to the drying tubes 20. The controller 28 is made responsive to the sensor 24 so that, if the temperature of the fluid and the amount of thermal energy available at the drying tubes 20 are greater than necessary to accomplish the drying function, less cobs can be directed to the furnace 22 and the amount of combustion air can be commensurately decreased. Additionally, the amount of fluid actually delivered to the drying tubes 20 by the draft fan 30 can be decreased.

A second sensor 32 can be mounted proximate the locations at which the drying tubes 20 enter the storage bin 19. The sensor 32 can include probes (not shown) for sensing the moisture content of the grain as it enters the bin 19. Means responsive to the sensor 32 can be utilized for varying the speed at which the grain is passed through the tubes 20. This means is illustrated schematically by phantom line 34.

Figure 2:
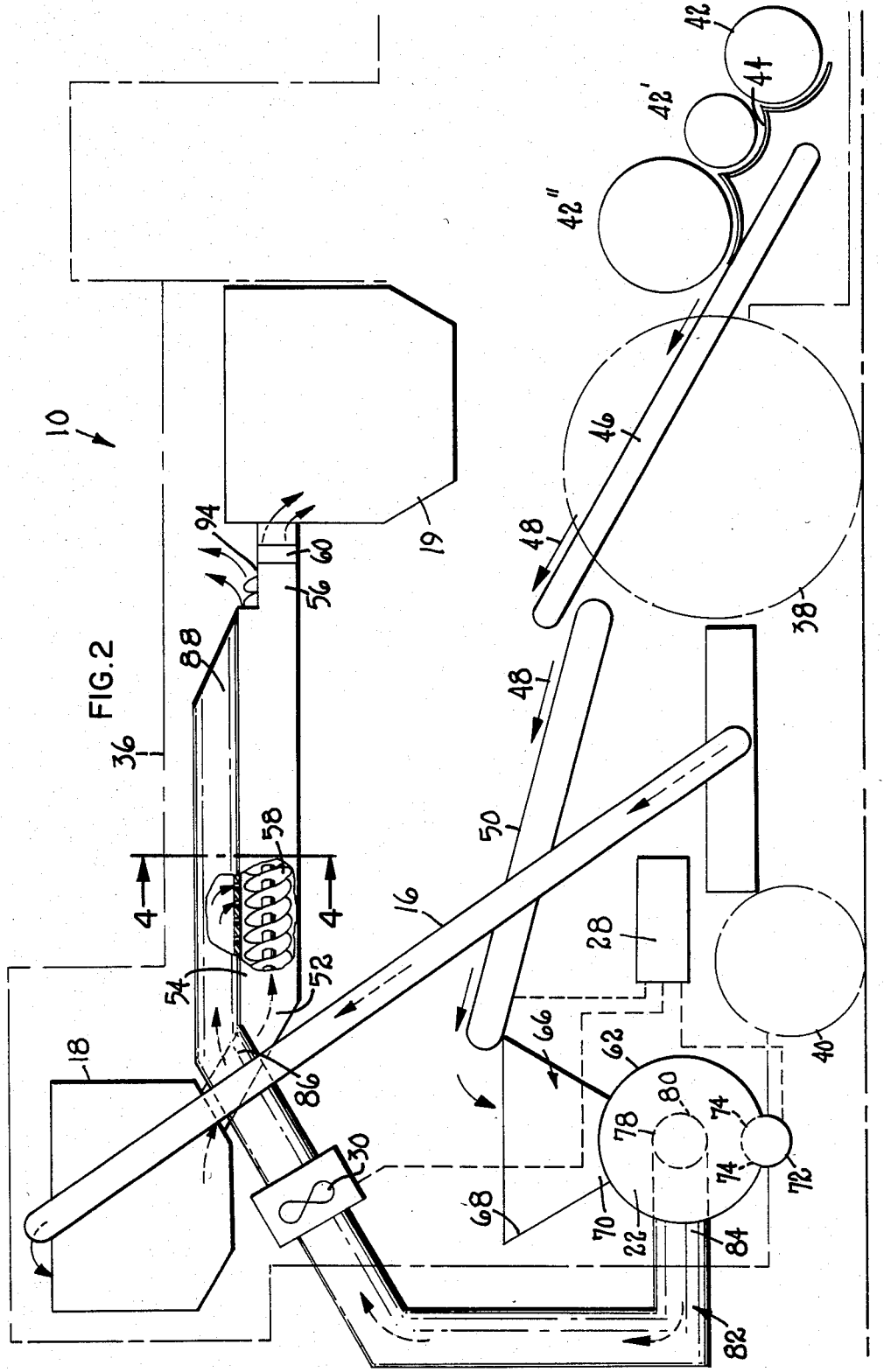
FIG. 2 is a side elevational, structural-schematic view of the combine of FIG. 1.

Referring now to FIG. 2, the invention is illustrated more structurally. A phantom line 36 generally illustrates the confines of the combine 10. The combine 10 is mounted by forward wheels 38 and rearward wheels 40 for movement over the ground. As viewed in that figure, a plurality of thrashing elements 42, 42', 42" are mounted at the bottom righthand corner. After being severed from the ground, agricultural crop plants are fed between these thrashing elements 42, 42', 42" and a wall 44 against which the plants are worked. The grain is thus separated from cobs, stalks, etc. and is passed, along with the residue materials onto a conveyor 46 which passes all of the thrashed parts rearwardly in a direction indicated by arrows 48.

The thrashed plants are, thereafter, passed on to a vibrating sieve type conveyor 50. The grain of the plants is allowed to pass through the conveyor 50 into a collection box 52. Elevator 16, thereafter raises the grain and deposits it in receptacle 18.

Proximate the bottom end of the distribution receptacle 18, a manifold 52 can be included for separating the grain into various portions so that all of the grain will be exposed to the thermal energy by which it is to be dried in a manner described hereinafter. It has been found appropriate to divide the grain from the receptacle 18 into four portions each passing through one of four drying tubes 20. The manifold 52, therefore, can include four outlet apertures, each communicating with a first end 54 of one grain transfer tube 20. A second end 56 of each tube communicates with one of four inlets formed in the storage bin 19.

The grain can be made to pass through the tubes 20 by an auger 58 rotatably mounted in each. Each auger 58 can be driven by a fluid drive motor. One motor is illustrated schematically in FIG. 2 by reference numeral 60.

While the grains of the plants pass through the sieve like conveyor 50, the residue materials continue along the conveyor 50 and are deposited in the furnace 22 for burning. The furnace 22 can include a firebox defined by a generally cylindrical wall 62.

Figures 3, 4:
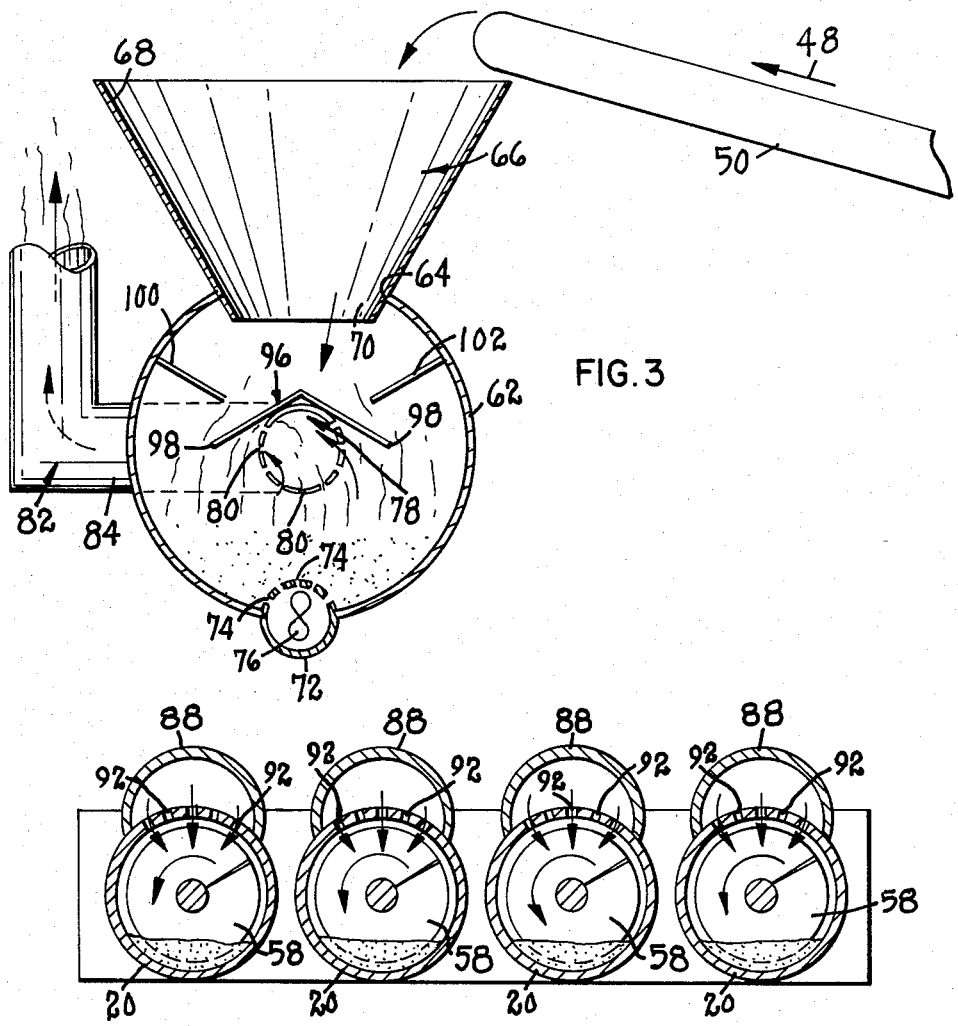
FIG. 3 is an enlarged sectional view of the furnace used to generate thermal energy.
FIG. 4 is a view taken along the line 4—4 of FIG. 2.

Referring now to FIG. 3 for a more detailed description of the furnace 22, the cylindrical wall 62 can have formed therein an upwardly positioned aperture 64. A hopper 66 is shown seated in the aperture 64 with the wall defining the hopper 66 sloping downwardly and inwardly. The hopper 66 functions as a funnel, and the residue material enters through the upper wide mouth 68 of the funnel and exits through the small mouth 70 into the fire box.

Means are provided for allowing entry of combustion air into the firebox. This air inlet means can comprise a duct 72 extending axially with respect to the firebox and positioned at a bottom location thereon so that a portion of the duct is disposed within the cylindrical wall 62 of the firebox. That portion of the duct 72 within the cylindrical wall can be perforated, as at 74 so that air taken into the duct 72 can pass into the firebox. A fan 76 can be mounted within the duct 72 to force air therethrough.

An exhaust conduit 78 is shown as extending axially within the firebox. The conduit 78 is positioned centrally within the firebox. It is perforated as at 80 so that the products of combustion of the residue material deposited in the firebox and the combustion air can pass into the conduit 78. The conduit 78 can, in some embodiments, be defined by a generally cylindrical peripheral wall.

A channeling member or stack 82 is provided for channeling the products of combustion away from the firebox. The stack 82 communicates, at its first end, with the exhaust conduit 78 and, at its second end 86, with a pluralitty of cowls 88 overlying each of said drying tubes 20. Draft inducing fan 30 can be positioned in the stack 82 to facilitate flow of the heat laden fluid from the firebox to the cowls 88.

Each drying tube 20 can have a multiplicity of perforations 72 formed in its wall so that the gaseous fluid can pass therethrough into the drying tubes 20 in order to permeate the grain being moved by the augers 58. Each cowl 88 is closed at an end away from the end at which the hot gas enters so that all of the fluid will pass through the multiplicity of perforations 92. As the hot gas passes about the grain, it absorbs moisture therefrom. The slower the grain passes through the drying tubes 20, therefore, the dryer it will become.

At the second ends 56 of the drying tubes 20, proximate the storage bin 19, each tube 20 is provided with an exhaust port 94 through which the now moisture laden gaseous fluid can be vented. The grain, relieved of a percentage of its moisture content, passes into the bin 19.

As previously discussed sensor means can be provided for measuring the moisture content of the grain entering the bin 19. If the moisture content is in excess of the maximum acceptable percentage of 15 percent, the fluid motors 60 driving the augers 58 will be automatically slowed down in response to the sensor measurement. In this way, the desired dryness of the grain can be insured.

Referring again to FIG. 3, baffles can be provided for both directing the flow of residue material into the firebox and for preventing the escape of thermal energy as carried by the gaseous fluid. An inverted generally V-shaped baffle 96 can be made to extend axially within the firebox overlying the exhaust conduit 78. Each leg of the baffle can have a length so that an extremity 98 thereof extends beyond the peripheral wall of the exhaust conduit 78.

Additionally, a pair of baffles 100, 102 can be made to extend inwardly into the firebox from the cylindrical wall thereof. These baffles 100, 102 are shown positioned above the generally V-shaped baffle 96 and spaced therefrom. Portions of these baffles 100, 102 overlap the legs of the generally V-shaped baffle 96.

Because of the nature of the residue material burned in the furnace 22, no ash is left in the firebox after combustion. Thus, ash disposal problems are precluded.

When the residue material is burned, it produces, in turn, combustible gases. These combustible gases can be reburned. Significant amounts of thermal energy can thus be obtained using materials that, under the prior art, had little value.

Although the furnace 22 and stack 82 have been defined as producing products of combustion which are conveyed directly to the drying tubes 20, it will be understood that the thermal energy generated in the firebox can be conveyed to the drying tubes 20 in different ways. An appropriate heat exchanger carrying clean air could be positioned in the firebox to absorb the thermal energy generated therein. This air could in turn, be channeled to the drying tubes 20. Alternatively, the products of combustion could be channeled to the drying tubes 20 at which locations a heat exchanger could be positioned so that only clean air actually enters the drying tubes 20.

Numerous characteristics and advantages of the invention have been set forth in the foregoing description. It will be understood, of course, that this disclosure is only illustrative. Changes may be made in many respects, particularly in matters of shape, size, and arrangement of parts without exceeding the scope of the invention. The appropriate scope is defined in the language in which the appended claims are expressed.

What is claimed is:

1. In combination with a grain crop harvesting combine wherein the combine includes means for separating the grain of the plant from residue material such as plant husks, leaves, cobs, and stalks; a grain drying attachment, comprising:
   (a) a grain distributor in which the separated grain is received;
   (b) a dried grain storage bin;
   (c) means for transferring the grain from said distributor to said bin;
   (d) a burner chamber in which the residue material is deposited and burned to generate thermal energy, said burner chamber comprises a furnace capable of burning both the residue material and combustible gaseous products of the burning material, said furnace comprising:
      (i) a firebox defined by a generally cylindrical wall having an upwardly placed aperture;
      (ii) a hopper having a downwardly and inwardly sloping wall, said hopper being seated in said aperture;
      (iii) air inlet means disposed proximate the bottom of said firebox;
      (iv) a perforated combustion product exhaust conduit positioned centrally within said firebox; said conduit having a peripheral wall;
      (v) an inverted generally V-shaped baffle overlying said conduit and having a pair of legs, each with an extremity extending laterally beyond said peripheral wall of said conduit; and
      (vi) a pair of baffles extending downwardly and inwardly from said generally cylindrical wall of said firebox and positioned above, and spaced from, said generally V-shaped baffle, each pair of baffles overlapping one of said legs of said generally V-shaped baffle; and
   (e) means for using said thermal energy to dry the grain as it is transferred from said distributor to said bin.

2. The combination in accordance with claim 1 wherein said burner chamber comprises a furnace having means for controlling the rates of inflow of residue material and combustion air.

3. The combination in accordance with claim 2 wherein said controlling means includes automatic operating means and manual override means.

4. The combination of claim 1 wherein said conduit, said generally V-shaped baffle, and said pair of baffles extend generally axially within said firebox.

5. The combination of claim 1 wherein said air inlet means comprises an axially extending duct intersecting said firebox wall so that a portion of said duct is internal to said firebox wall and a portion of said duct is external to said firebox wall, and wherein said internal portion is perforated.

6. The combination of claim 5 wherein said duct includes fan means positioned therein to draw in air for combustion.

7. The combination of claim 6 wherein said means for using said thermal energy comprises a channeling member communicating, at a first end thereof, with said combustion product exhaust conduit, and wherein a second end of said channeling member emits the products of combustion at said transferring means to dry the grain.

8. The combination of claim 7 wherein said channeling member includes draft inducing means.

9. The combination of claim 1 wherein said distributor comprises a manifold for dividing the separated grain into a plurality of portions, and wherein said transferring means transfers each of said portions from said manifold to said storage bin.

10. The combination of claim 9 wherein said manifold includes a plurality of outlet apertures and said storage bin includes a corresponding number of inlets, and wherein said transferring means comprises a corresponding number of grain transfer tubes, each of said tubes including a first end at one of said outlet apertures, a second end at one of said inlets, and an auger rotatably disposed therein.

11. A grain drying attachment for use with a combine for harvesting grain plants and separating the grain of the plants from residue materials, comprising:
   (a) a grain receptacle into which the undried separated grain from the combine is deposited;
   (b) a bin in which dried grain is received;
   (c) transfer means for conveying grain from said receptacle to said bin;
   (d) a furnace in which the residue materials from the combine are deposited and burned to generate heat, said furnace comprises:
      (i) a firebox defined by a generally cylindrical wall having an upwardly placed aperture;
      (ii) a hopper having a downwardly and inwardly sloping wall, said hopper being seated in said aperture;
      (iii) air inlet means disposed proximate the bottom of said firebox;
      (iv) a perforated combustion product exhaust conduit positioned centrally within said firebox, said conduit having a peripheral wall;
      (v) an inverted, generally V-shaped baffle overlying said conduit and having a pair of legs, each with an extremity extending laterally beyond said peripheral wall of said conduit; and
      (iv) a pair of baffles extending downwardly and inwardly from said generally cylindrical wall of said firebox and positioned above, and spaced from, said generally V-shaped baffle, each of said pair of baffles overlapping one of said legs of said generally V-shaped baffle; and
   (e) means for transmitting said heat from said furnace to the grain as it is transferred from said receptacle to said bin.

* * * * *